United States Patent
Burrell et al.

(10) Patent No.: US 9,645,625 B2
(45) Date of Patent: May 9, 2017

(54) SYSTEM AND METHOD FOR POWER MANAGEMENT OF COMPUTING DEVICES IN A VIRTUAL DESKTOP INFRASTRUCTURE

(71) Applicant: AMERICAN MEGATRENDS, INC., Norcross, GA (US)

(72) Inventors: Brandon Burrell, Suwanee, GA (US); Chandrasekar Rathineswaran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 188 days.

(21) Appl. No.: 14/626,400

(22) Filed: Feb. 19, 2015

(65) Prior Publication Data

US 2016/0246341 A1 Aug. 25, 2016

(51) Int. Cl.
*G06F 1/26* (2006.01)
*G06F 9/455* (2006.01)

(52) U.S. Cl.
CPC ............ *G06F 1/26* (2013.01); *G06F 9/45558* (2013.01); *G06F 2009/45591* (2013.01)

(58) Field of Classification Search
CPC ............ G06F 1/26; G06F 2009/45591; G06F 9/45558
See application file for complete search history.

(56) References Cited

U.S. PATENT DOCUMENTS

| | | | | |
|---|---|---|---|---|
| 2008/0184226 A1* | 7/2008 | Ota | ......................... | H04L 67/22 718/1 |
| 2010/0218014 A1* | 8/2010 | Bozek | .................... | G06F 1/3209 713/320 |
| 2012/0065802 A1* | 3/2012 | Seeber | .................. | G06F 1/3203 700/295 |
| 2012/0138677 A1* | 6/2012 | Ma | ......................... | G07F 19/207 235/379 |
| 2015/0379491 A1* | 12/2015 | Ma | ........................ | G07F 19/209 235/379 |
| 2016/0088432 A1* | 3/2016 | Myers | ..................... | H04W 4/02 340/5.2 |

* cited by examiner

*Primary Examiner* — Thomas Lee
*Assistant Examiner* — Chad Erdman
(74) *Attorney, Agent, or Firm* — Locke Lord LLP; Tim Tingkang Xia, Esq.

(57) ABSTRACT

Certain aspect of the present disclosure relates to a power management system. A detection device generates detection signals based on detection of a plurality of user identification (ID) devices, and sends the detection signals to a power management controller. For each of the user ID devices being detected, the power management controller retrieves the corresponding user ID, and determines a user ID device presence event based on the received detection signals. In response to determining the user ID device presence event, the power management controller retrieves device IDs associated with the corresponding user ID of the user ID device from a database, and determine a target device based on the retrieved device IDs. Then the power management controller may power on or power off the target device based on the determined user ID device presence event and the power state of the target device.

28 Claims, 4 Drawing Sheets

SYSTEM AND METHOD FOR POWER MANAGEMENT OF COMPUTING DEVICES IN A VIRTUAL DESKTOP INFRASTRUCTURE

FIELD

The present disclosure relates generally to virtual desktop infrastructure (VDI) technology, and more particularly to systems and methods for automatic power management of computing devices in a VDI environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Remote desktop virtualization implementations operate as client/server computing environments. Application execution takes place on a virtual desktop of a virtual machine which is linked to the local client device over a network or a cloud using a remote display protocol through which the user interacts with applications. All applications and data used remain on the virtual machine with only display, keyboard, and mouse information communicated with the local client device which may be a conventional personal computer, a laptop computer, a thin client device, a tablet, or even a smartphone. A common implementation of this approach is to host multiple desktop operating system instances on one or more virtual machine hardware platform running a hypervisor. This is generally referred to as "Virtual Desktop Infrastructure" or "VDI". However, the convenient access to the virtual desktops of the virtual machine presents potential wasteful consumption of energy and/or computer resources if all computing devices connected to the VDI are running all the time.

Therefore, an unaddressed need exists in the art to address the aforementioned deficiencies and inadequacies.

SUMMARY

In one aspect, the present disclosure relates to a system. In certain embodiments, the system includes: (a) a plurality of user identification (ID) devices, each corresponding to a user ID; (b) a plurality of computing devices, each corresponding to a computing device ID (CDID), where each of the user IDs is associated with one of the CDIDs; (c) at least one detection device configured to generate detection signals based on detection of the user ID devices; (d) a virtual machine server configured to execute a plurality of virtual machines (VMs), where each of the VMs corresponds to a virtual machine ID (VMID), and each of the user IDs is associated with one of the VMIDs; and (e) a power management controller being connected to the computing devices, the at least one detection device and the virtual machine server through a network. The power management controller includes a processor and a memory storing computer executable instructions. The computer executable instructions, when executed at the processor, are configured to: (a) receive the detection signals from the at least one detection device through the network; and (b) for each of the user ID devices being detected by at least one the detection device, (i) retrieve, from the received detection signals, the corresponding user ID of the detected user ID device; (ii) determine, based on the received detection signals, a user ID device presence event related to the detected user ID device, wherein the user ID device presence event is one of an ingress event when a carrier of the detected user ID device moves into a predefined area, and an egress event when the carrier of the detected user ID device moves out from the predefined area; (iii) in response to determining the user ID device presence event related to the detected user ID device, retrieve the CDID and the VMID associated with the corresponding user ID of the user ID device from a database; (iv) determine a target device based on the CDID and the VMID associated with the corresponding user ID of the user ID device, wherein the target device comprises at least one of the VM corresponding to the associated VMID, the computing device corresponding to the associated CDID, and a peripheral device attached to the computing device corresponding to the associated CDID; (v) when the determined user ID device presence event related to the detected user ID device is the ingress event and when the target device is in an off state, power on the target device; and (vi) when the determined user ID device presence event related to the detected user ID device is the egress event and when the target device is in an on state, power off the target device.

In certain embodiments, each of the plurality of user ID devices represents a user and stores the corresponding user ID therein.

In certain embodiments, for each of the user ID devices, the carrier of the user ID device is the user being represented by the user ID device.

In certain embodiments, the at least one detection device includes: a security control system of the predefined area configured to detect the arrivals and departures of the users carrying the user ID devices individually; a proximity detection device configured to detect the presence at and the departure from the predefined area for each of the users carrying the user ID devices individually; and a wireless device detection device configured to detect the presence at and the departure from the predefined area for each of the users carrying the user ID devices individually.

In certain embodiments, the computer executable instructions are configured to determine, based on the received detection signals, the user ID device presence event related to the detected user ID device by: (a) determining that the user ID device presence event is the ingress event when the received detection signals indicate that: (i) the user arrives at the predefined area through the security control system; (ii) the user ID transmitted from the user ID device is detected by the proximity detection device of the predefined area upon the user's arrival; and (iii) the user ID transmitted from the user ID device is detected by the wireless device detection device of the predefined area upon the user's arrival; and (b) determining that the user ID device presence event is the egress event when the received detection signals indicate that: (i) the user departs from the predefined area through the security control system; (ii) the user ID transmitted from the user ID device is detected by the proximity detection device of the predefined area upon the user's departure; and (iii) the user ID transmitted from the user ID device is detected by the wireless device detection device of the predefined area upon the user's departure.

In certain embodiments, each of the user ID devices is a portable device capable of transmitting the user ID to the detection device, wherein the portable device is a key card, a proximity card, a proximity key tag, a radio-frequency identification (RFID) card, a near field communication (NFC) device, or a mobile communication device.

In certain embodiments, the power management controller further comprises a network interface controller configured to connect the power management controller to the network.

In certain embodiments, the computer executable instructions include: (a) a determination module configured to, for each of the user ID devices being detected, (i) retrieve, based on the received detection signals, the corresponding user ID of the detected user ID device; (ii) determine the user ID device presence event related to the detected user ID device; and (iii) determine the target device based on the CDID and the VMID associated with the corresponding user ID of the user ID device; (b) a user ID lookup module configured to, for each of the user ID devices being detected, retrieve the CDID and the VMID associated with the corresponding user ID of the user ID device from the database in response to determining the user ID device presence event related to the detected user ID device; and (c) a power management module configured to, for each of the user ID devices being detected, (i) when the determined user ID device presence event related to the detected user ID device is the ingress event and when the target device is in an off state, power on the target device; and (ii) when the determined user ID device presence event related to the detected user ID device is the egress event and when the target device is in an on state, power off the target device.

In certain embodiments, the computer executable instructions further include a web server module configured to allow an administrator to perform power management system functions over the network.

In certain embodiments, the computer executable instructions are further configured to: receive and store registration information of each of the user ID devices with the corresponding user ID in the database, wherein the registration information comprises the corresponding user ID; receive and store the CDIDs corresponding to the computing devices in the database; receive and store the VMIDs corresponding to the VMs in the database; and receive and store association information of the user IDs to the CDIDs and the user IDs to the VMIDs in the database.

In certain embodiments, each of the computing devices is a laptop computer, a desktop computer, a mobile communication device, a tablet device, or a thin client device. In certain embodiments, the peripheral device attached to each of the computing devices includes one or more monitors, one or more multimedia devices, a mouse, a keyboard, an input device, and a storage device.

In certain embodiments, the computer executable instructions are further configured to: when powering on the target device, apply a power-on delay T1 to delay powering on of the target device; and when powering off the target device, apply a power-off delay T2 to delay the powering off of the target device.

In another aspect, the present disclosure relates to a computer-implemented method of performing power management of a system. In certain embodiments, the method includes: (a) receiving, at a power management controller, detection signals from at least one detection device through a network, wherein the at least one detection device is configured to generate the detection signals based on detection of a plurality of user identification (ID) devices, wherein each of the user ID devices corresponds to a user ID, and wherein each of the user IDs is associated with a computing device ID (CDID) and a virtual machine ID (VMID); and (b) for each of the user ID devices being detected by at least one the detection device, (i) retrieving, at the power management controller, the corresponding user ID of the detected user ID device from the received detection signals; (ii) determining, at the power management controller, a user ID device presence event related to the detected user ID device based on the received detection signals, wherein the user ID device presence event is one of an ingress event when a carrier of the detected user ID device moves into a predefined area, and an egress event when the carrier of the detected user ID device moves out from the predefined area; (iii) in response to determining the user ID device presence event related to the detected user ID device, retrieving, at the power management controller, the CDID and the VMID associated with the corresponding user ID of the user ID device from a database; (iv) determining, at the power management controller, a target device based on the CDID and the VMID associated with the corresponding user ID of the user ID device, wherein the target device comprises at least one of a virtual machine (VM) corresponding to the associated VMID, a computing device corresponding to the associated CDID, and a peripheral device attached to the computing device corresponding to the associated CDID; (v) when the determined user ID device presence event related to the detected user ID device is the ingress event and when the target device is in an off state, powering on the target device by the power management controller; and (vi) when the determined user ID device presence event related to the detected user ID device is the egress event and when the target device is in an on state, powering off the target device by the power management controller.

In certain embodiments, each of the plurality of user ID devices represents a user and stores the corresponding user ID therein.

In certain embodiments, for each of the user ID devices, the carrier of the user ID device is the user being represented by the user ID device.

In certain embodiments, the power management controller includes a processor, a network interface controller configured to connect the power management controller to a network, and a memory storing computer executable instructions. In certain embodiments, the computer executable instructions include: (a) a determination module configured to, for each of the user ID devices being detected, (i) retrieve, based on the received detection signals, the corresponding user ID of the detected user ID device; (ii) determine the user ID device presence event related to the detected user ID device; and (iii) determine the target device based on the CDID and the VMID associated with the corresponding user ID of the user ID device; (b) a user ID lookup module configured to, for each of the user ID devices being detected, retrieve the CDID and the VMID associated with the corresponding user ID of the user ID device from the database in response to determining the user ID device presence event related to the detected user ID device; and (c) a power management module configured to, for each of the user ID devices being detected, (i) when the determined user ID device presence event related to the detected user ID device is the ingress event and when the target device is in an off state, power on the target device; and (ii) when the determined user ID device presence event related to the detected user ID device is the egress event and when the target device is in an on state, power off the target device.

In certain embodiments, the computer executable instructions further include a web server module configured to allow an administrator to perform power management system functions over the network.

In certain embodiments, the method further includes: receiving and storing, at the power management controller, registration information of each of the user ID devices with the corresponding user ID in the database, wherein the registration information comprises the corresponding user ID; receiving and storing, at the power management controller, the CDIDs corresponding to the computing devices in the database; receiving and storing, at the power management controller, the VMIDs corresponding to the VMs in the database; and receiving and storing, at the power management controller, association information of the user IDs to the CDIDs and the user IDs to the VMIDs in the database.

In certain embodiments, each of the user ID devices is a portable device capable of transmitting the user ID to the detection device, wherein the portable device is a key card, a proximity card, a proximity key tag, a radio-frequency identification (RFID) card, a near field communication (NFC) device, or a mobile communication device.

In certain embodiments, the method further includes: when powering on the target device, applying a power-on delay T1 to delay powering on of the target device; and when powering off the target device, applying a power-off delay T2 to delay the powering off of the target device.

In yet another aspect, the present disclosure relates to a non-transitory computer storage medium. The non-transitory computer storage medium stores computer-executable instructions. When the computer-executable instructions are executed by a processor of a power management controller, the executed instructions cause the processor to: (a) receive detection signals from at least one detection device through a network, wherein the at least one detection device is configured to generate the detection signals based on detection of a plurality of user identification (ID) devices, wherein each of the user ID devices corresponds to a user ID, and wherein each of the user IDs is associated with a computing device ID (CDID) and a virtual machine ID (VMID); and (b) for each of the user ID devices being detected by at least one the detection device, (i) retrieve the corresponding user ID of the detected user ID device, from the received detection signals; (ii) determine, based on the received detection signals, a user ID device presence event related to the detected user ID device, wherein the user ID device presence event is one of an ingress event when a carrier of the detected user ID device moves into a predefined area, and an egress event when the carrier of the detected user ID device moves out from the predefined area; (iii) in response to determining the user ID device presence event related to the detected user ID device, retrieve the CDID and the VMID associated with the corresponding user ID of the user ID device from a database; (iv) determine a target device based on the CDID and the VMID associated with the corresponding user ID of the user ID device, wherein the target device comprises at least one of a VM corresponding to the associated VMID, a computing device corresponding to the associated CDID, and a peripheral device attached to the computing device corresponding to the associated CDID; (v) when the determined user ID device presence event related to the detected user ID device is the ingress event and when the target device is in an off state, power on the target device; and (vi) when the determined user ID device presence event related to the detected user ID device is the egress event and when the target device is in an on state, power off the target device.

In certain embodiments, each of the plurality of user ID devices represents a user and stores the corresponding user ID therein.

In certain embodiments, for each of the user ID devices, the carrier of the user ID device is the user being represented by the user ID device.

In certain embodiments, the computer executable instructions include: (a) a determination module configured to, for each of the user ID devices being detected, (i) retrieve, based on the received detection signals, the corresponding user ID of the detected user ID device; (ii) determine the user ID device presence event related to the detected user ID device; and (iii) determine the target device based on the CDID and the VMID associated with the corresponding user ID of the user ID device; (b) a user ID lookup module configured to, for each of the user ID devices being detected, retrieve the CDID and the VMID associated with the corresponding user ID of the user ID device from the database in response to determining the user ID device presence event related to the detected user ID device; and (c) a power management module configured to, for each of the user ID devices being detected, (i) when the determined user ID device presence event related to the detected user ID device is the ingress event and when the target device is in an off state, power on the target device; and (ii) when the determined user ID device presence event related to the detected user ID device is the egress event and when the target device is in an on state, power off the target device.

In certain embodiments, the computer executable instructions further include a web server module configured to allow an administrator to perform power management system functions over the network.

In certain embodiments, the computer executable instructions are further configured to: receive and store registration information of each of the user ID devices with the corresponding user ID in the database, wherein the registration information comprises the corresponding user ID; receive and store the CDIDs corresponding to the computing devices in the database; receive and store the VMIDs corresponding to the VMs in the database; and receive and store association information of the user IDs to the CDIDs and the user IDs to the VMIDs in the database.

In certain embodiments, each of the user ID devices is a portable device capable of transmitting the user ID to the detection device, wherein the portable device is a key card, a proximity card, a proximity key tag, a radio-frequency identification (RFID) card, a near field communication (NFC) device, or a mobile communication device.

In certain embodiments, the computer executable instructions are further configured to: when powering on the target device, apply a power-on delay T1 to delay powering on of the target device; and when powering off the target device, apply a power-off delay T2 to delay the powering off of the target device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-4. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
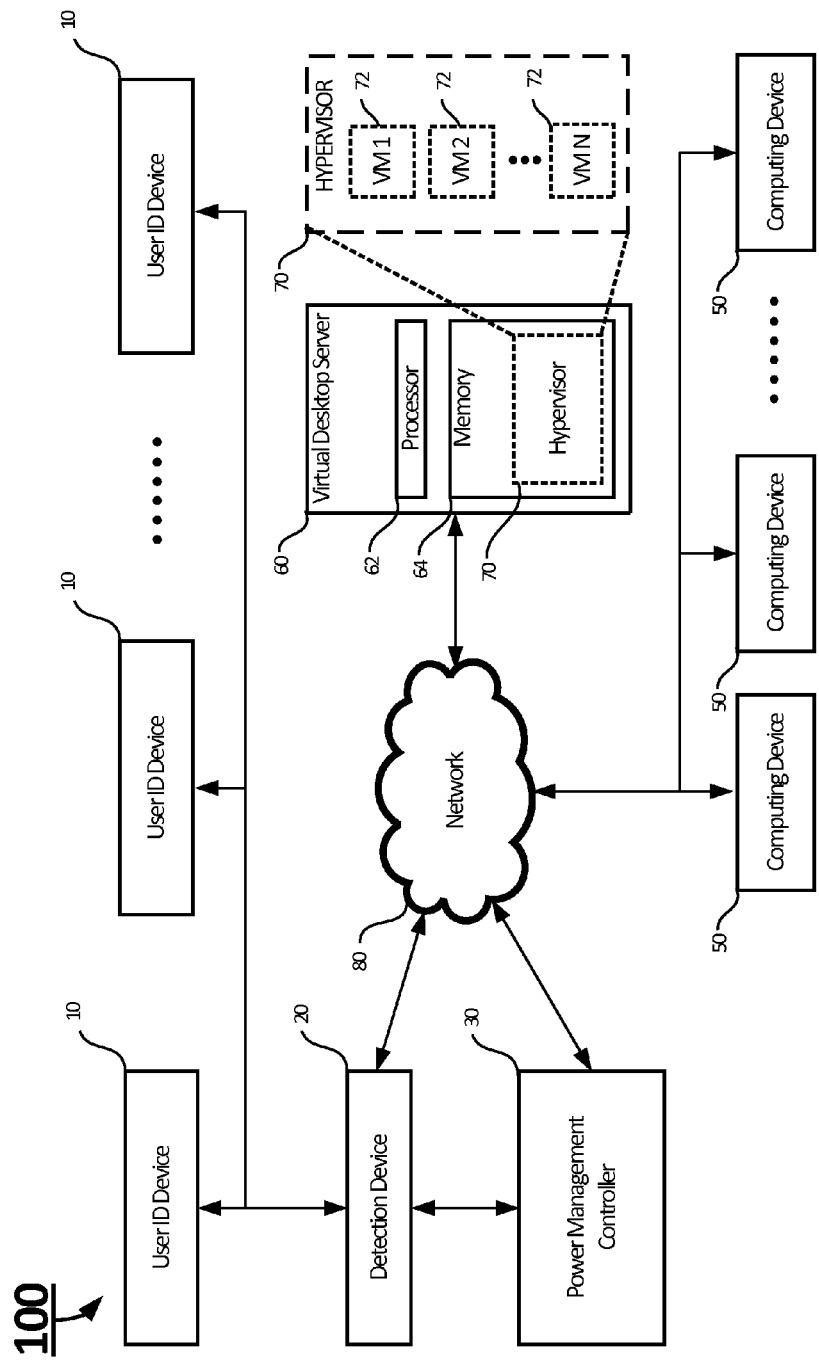
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "launching a virtual machine" or "powering up a virtual machine", as used herein, generally refers to a process of initiating or constructing a new virtual machine instance with a specific virtual machine ID on one or more virtual machine hardware platform running a hypervisor. Once the virtual machine is launched, the virtual machine is in an "on" state. The term "shutting down a virtual machine" or "powering off a virtual machine", as used herein, generally refers to a process of deleting an existing virtual machine instance with a specific virtual machine ID on one or more virtual machine hardware platform running a hypervisor. Once the virtual machine instance is deleted, the virtual machine is in an "off" state.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, FIGS. 1-4, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Remote desktop virtualization is frequently used in a variety of different scenarios. For example, remote desktop virtualization may be used in distributed environments with high availability requirements and where desk-side technical support is not readily available, such as branch office and retail environments. In certain embodiments, remote desktop virtualization may be used in environments where high network latency degrades the performance of conventional client/server applications. In certain embodiments, remote desktop virtualization may be used in environments where remote access and data security requirements create conflicting requirements that can be addressed by retaining all (application) data within the data center with only display, keyboard, and mouse information communicated with the remote client. Remote desktop virtualization may be used as a means of providing access to Windows applications on non-Windows endpoints including tablets, smart phones and non-Windows-based desktop PCs and laptops. In certain embodiments, remote desktop virtualization may be used as a means of resource sharing, to provide low-cost desktop computing services in environments where providing every user with a dedicated desktop PC is either too expensive or otherwise unnecessary. As described above, the convenient access to the virtual desktops of the virtual machine presents potential wasteful consumption of energy and/or computer resources if all virtual machines are running all the times. Thus, it is desirable to keep virtual machines off when users of these virtual machines are not present at the work place, and launch a virtual machine when a user associated with the virtual machine is present at the work place.

Figure 2:
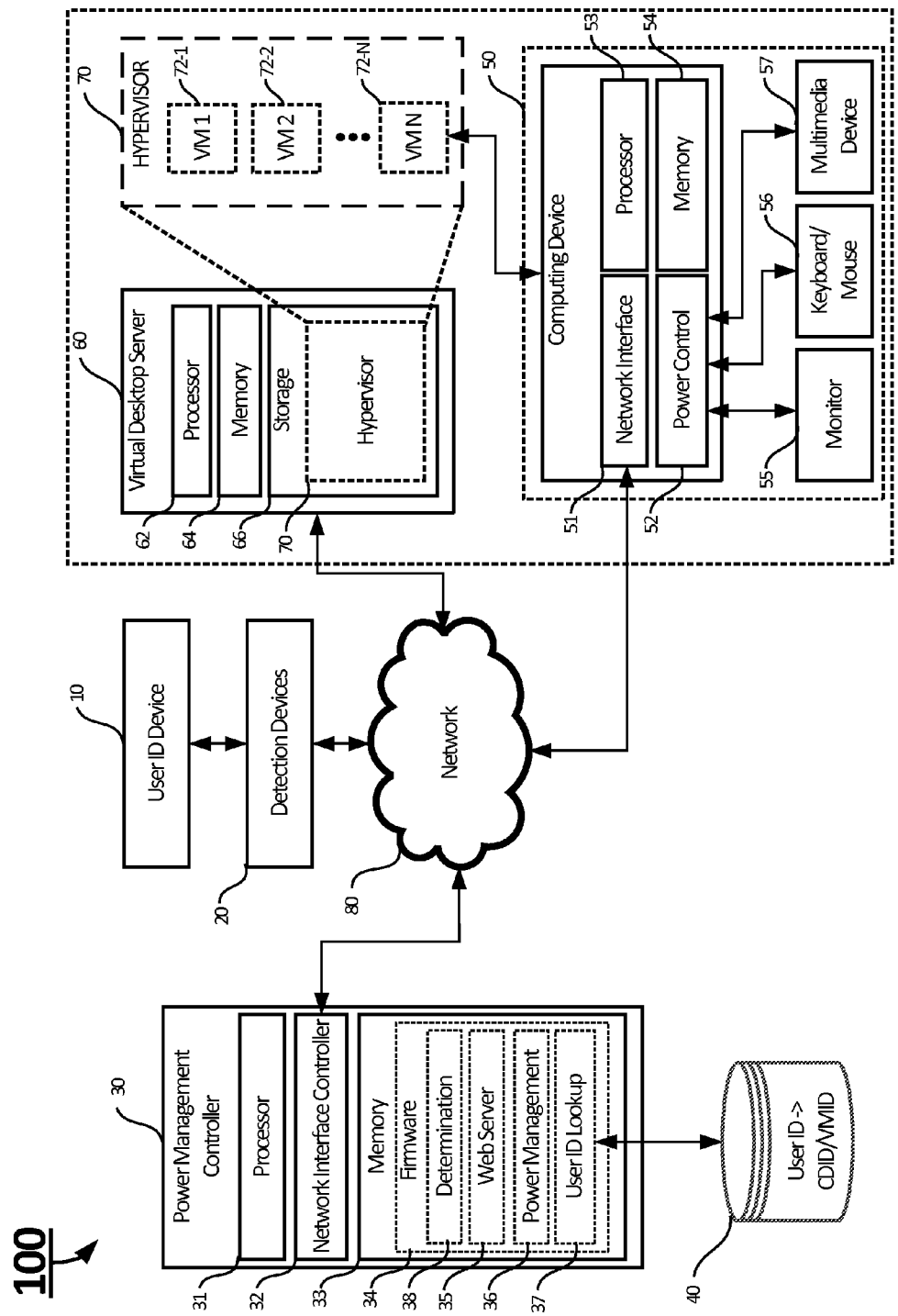
FIG. 2 schematically depicts a system according to certain embodiments of the present disclosure.

In accordance with the purposes of present disclosure, as embodied and broadly described herein, in certain aspects, the present disclosure relates to a VDI system 100 having power management features. FIG. 1 schematically depicts a system according to certain embodiments of the present disclosure. FIG. 2 schematically depicts a system in more details according to certain embodiments of the present disclosure. As shown in FIGS. 1 and 2, the system 100 includes a plurality of user ID devices 10, at least one detection device 20, a power management controller 30, a plurality of computing device 50, and at least one virtual desktop server 60 being interconnected through a network 80. As shown in FIG. 2, the power management controller 30 may have a database 40. The network 80 may be a wired or wireless network, and may be of various forms, such as a public network and a private network. Examples of the network 80 may include, but not limited to, a local area network (LAN) or wide area network (WAN) including the Internet. In certain embodiments, two or more different networks 80 may be applied to connect the components of the system 100. In other words, the system 100 may include multiple networks 80.

Each of the user ID devices 10 is a device which represents a corresponding user, and each user is assigned a specific user ID. In other words, each of the users of the system 100 has a user ID device 10 corresponding to a user ID. For example, in a company utilizing the system 100, each of the employees is a user of the system 100, and has a user ID device 10 corresponding to the specific user ID of the employee. Thus, the number of the user ID devices 10 equals the number of the employees. In certain embodiments, each user ID device 10 stores the corresponding user ID therein. In certain embodiments, for each of the user ID devices 10, the carrier of the user ID device 10 is the user being represented by the user ID device 10. In certain embodiments, each of the user ID devices 10 is a portable device capable of transmitting the user ID to the detection device. Examples of the portable device may include a key card, a proximity card, a proximity key tag, a radio-frequency identification (RFID) card, a near field communication (NFC) device, or a mobile communication device. In certain embodiments, the mobile communication device may be capable of using and transmitting device location information to locate the mobile communication device. For example, the mobile communication device may include a global positioning system (GPS), which may be communicated to a cell phone tower or a base station to obtain location information and/or other information of the portable device.

The detection device 20 is a device for detecting the presence of the user ID devices 10. When the detection device 20 detects the user ID devices 10, the detection device 20 generates detection signals based on detection of the user ID devices 10, and sends the detection signals to the power management controller 30 for processing. Generally, the detection device 20 may have a range of detection, such that the user ID devices 10 within the range of detection may be effectively detected by the detection device 20. When a user ID device 10 is out of the range of detection of the detection device 20, the detection device 20 may be unable to detect the user ID device 10. In certain embodiments, the detection device 20 may be a security control system of the predefined area configured to detect the arrivals and departures of the users carrying the user ID devices individually. In certain embodiments, the detection device 20 may be a proximity detection device configured to detect the presence at and the departure from the predefined area for each of the users carrying the user ID devices individually. In certain embodiments, the detection device 20 may be a wireless device detection device configured to detect the presence at and the departure from the predefined area for each of the users carrying the user ID devices individually. In certain embodiments, the system 100 may include one or more detection devices 20.

The computing devices 50 allow the users to access the virtual desktop services of the system 100. In certain embodiments, each of the users of the system 100 is designated to use one of the computing devices 50 to access the virtual desktop services of the system 100, and the number of the computing devices 50 corresponds to the number of the users of the system 100. In this case, each computing device 50 corresponds to a computing device ID (CDID), and each of the user IDs is associated with one of the CDIDs. Thus, the users may be associated with a corresponding computing device 50 based on the association information of the user IDs to the CDIDs. Details of the computing devices 50 will be described later.

The virtual desktop server 60 is a computing device functioning as a server to provide the virtual desktop services of the system 100. In certain embodiments, the virtual desktop server 60 may be implemented by one or more computing devices. As shown in FIG. 2, the virtual desktop server 60 includes at least one processor 62, a memory 64, and a storage 66.

The processor 62 is a host processor which is configured to control operation of the virtual desktop server 60. In certain embodiments, the processor 62 may be a central processing unit (CPU). The processor 62 can execute any computer executable code or instructions, such as the hypervisor 70 or other applications of the virtual desktop server 60. In certain embodiments, the virtual desktop server 60 may run on more than one CPU as the host processor, such as two CPUs, four CPUs, eight CPUs, or any suitable number of CPUs.

The memory 64 can be a volatile memory, such as the random-access memory (RAM), for storing the data and information during the operation of the virtual desktop server 60.

The storage 66 is a non-volatile data storage media for storing the hypervisor 70 and other applications of the virtual desktop server 60. Examples of the storage 66 may include flash memory, memory cards, USB drives, hard drives, floppy disks, optical drives, or any other types of data storage devices. In certain embodiments, the storage 66 may be in the form of a storage server, which may be independent from the virtual desktop server 60. When the hypervisor 70 is operating on the processor 62 of the virtual desktop server 60, a number of virtual machines 72 (72-I, I=1, 2, . . . N) may be initiated or launched for providing virtual desktop services for a number of users.

The hypervisor 70 is a program that allows multiple virtual machine instances to run simultaneously and share a single hardware host, such as the virtual desktop server 60. The hypervisor 70, when executed at the processor 62, implements hardware virtualization techniques and allows one or more operating systems or other applications to run concurrently as guests of one or more virtual machines on the host server (i.e. the virtual desktop server 60). The hypervisor 70 allows each user to run an operating system instance as a virtual machine. In certain embodiments, the hypervisor 70 may be of various types and designs, such as MICROSOFT HYPER-V, XEN, VMWARE ESX, or other types of hypervisors.

As shown in FIG. 1, when the hypervisor instance 70 runs on the virtual desktop server 60, the hypervisor 70 emulates one or more virtual computer machine, including a virtual CPU and a virtual memory (not shown). One or more virtual machines 72-I, I=1, 2, . . . N can operate on the one or more virtual machine hardware platform running the hypervisor 70. Each of the virtual machines 72-I, I=1, 2, . . . , N can run a virtual machine operation system (VMOS), such as WINDOWS or LINUX. For brevity, unless otherwise noted, a virtual machine and the virtual machines operating system run in that virtual machines are collectively referred to as a virtual machine (such as each virtual machines 72-i, i=1, 2, . . . , N shown in FIG. 1).

In one embodiment, the virtual machines 72 include N virtual machines, and they are a first virtual machine 72-1, a second virtual machine 72-2, the third virtual machine 72-3, . . . , and a N-th virtual machine 72-N. Each virtual machine 72 is assigned with a virtual machine ID (VMID). In certain embodiments, one or more of virtual desktops are running on each of the virtual machines 72.

The power management controller 30 is a controller to provide power management features of the system 100. In certain embodiments, the power management controller 30 is configured to manage the power consumption of the computing devices 50 and the VMs 72 such that when a user is not present in his/her workplace, the computing device 50 and/or the VM 72 associated with the user may be powered off to conserve energy, and when the user is approaching his/her workplace, the computing device 50 and/or the VM 72 associated with the user may be powered on so that the user does not need to wait the computing device 50 and/or the VM 72 to warm up, and boot up.

As shown in FIG. 2, the power management controller 30 includes at least a processor 31, a network interface controller 32, and a memory 33. The memory 33 may be a non-volatile memory storing computer executable instructions, such as the firmware 34 of the power management controller 30. In certain embodiments, the firmware 34 includes: a web server module 35, a power management module 36, a user ID lookup module 37, and a determination module 38.

The web server module 35 is configured to allow an administrator of the system 100 to perform power management system functions over the network 80. In certain embodiments, the administrator may connect to the power management controller 30 using one of the computing devices 50 to operate the web server module 35.

The user ID lookup module 37 is configured to, for each of the user ID devices 10 being detected, retrieve the CDID and the VMID associated with the corresponding user ID of the user ID device 10 from the database 40 in response to determining a user ID device presence event related to the detected user ID device. In certain embodiments, the user ID device presence event may be one of an ingress event when a carrier of the detected user ID device 10 moves into a predefined area, and an egress event when the carrier of the detected user ID device 10 moves out from the predefined area. In certain embodiments, the carrier of the user ID device 10 is the user being represented by the user ID device 10. When the determination module 38 determines that the user ID device presence event related to a detected user ID device 10 has occurred, the user ID lookup module 37 looks up the data stored in the database 40 to retrieve the CDID and the VMID associated with the corresponding user ID of the detected user ID device 10.

The determination module 38 is configured to, for each of the user ID devices 10 being detected, (a) retrieve, based on the received detection signals from the detection device 20, the corresponding user ID of the detected user ID device 10; (b) determine the user ID device presence event related to the detected user ID device 10; and (c) determine a target device based on the CDID and the VMID associated with the corresponding user ID of the user ID device 10. In certain embodiments, the target device may be at least one of the VM 72 corresponding to the associated VMID, the computing device 50 corresponding to the associated CDID, and a peripheral device attached to the computing device 50 corresponding to the associated CDID.

In certain embodiments, the determination module 38 determines the user ID device presence event related to the detected user ID device 10 based on the detection signals from different detection devices 20. For example, the determination module 38 may determine that the user ID device presence event is the ingress event when the received detection signals indicate that: (a) the user arrives at the predefined area through the security control system; (b) the user ID transmitted from the user ID device 10 is detected by the proximity detection device of the predefined area upon the user's arrival; and/or (c) the user ID transmitted from the user ID device 10 is detected by the wireless device detection device of the predefined area upon the user's arrival. Further, the determination module 38 may determine that the user ID device presence event is the egress event when the received detection signals indicate that: (a) the user departs from the predefined area through the security control system; (b) the user ID transmitted from the user ID device 10 is detected by the proximity detection device of the predefined area upon the user's departure; and/or (c) the user ID transmitted from the user ID device 10 is detected by the wireless device detection device of the predefined area upon the user's departure.

The power management module 36 is configured to perform the power management functions to the target device based on the determination results of the determination module 38. In certain embodiments, for each of the user ID devices 10 being detected, the power management module 36 is configured to: (a) when the determined user ID device presence event related to the detected user ID device 10 is the ingress event and when the target device is in an off state, power on the target device; and (b) when the determined user ID device presence event related to the detected user ID device 10 is the egress event and when the target device is in an on state, power off the target device.

The database 40 stores the data representing the association between the user IDs, the CDIDs and the VMIDs. In certain embodiments, the data stored in the database 40 includes the registration information of each of the user ID devices 10; the CDIDs corresponding to the computing devices 50; the VMIDs corresponding to the VMs 72; and association information of the user IDs to the CDIDs and the user IDs to the VMIDs. In certain embodiments, where the registration information of each of the user ID devices 10 includes the corresponding user ID.

In certain embodiments, the firmware 34 of the power management controller 30 is further configured to: (a) receive and store registration information of each of the user ID devices 10 with the corresponding user ID in the database 40; (b) receive and store the CDIDs corresponding to the computing devices 50 in the database 40; (c) receive and store the VMIDs corresponding to the VMs 72 in the database 40; and (d) receive and store association information of the user IDs to the CDIDs and the user IDs to the VMIDs in the database 40.

Figure 3:
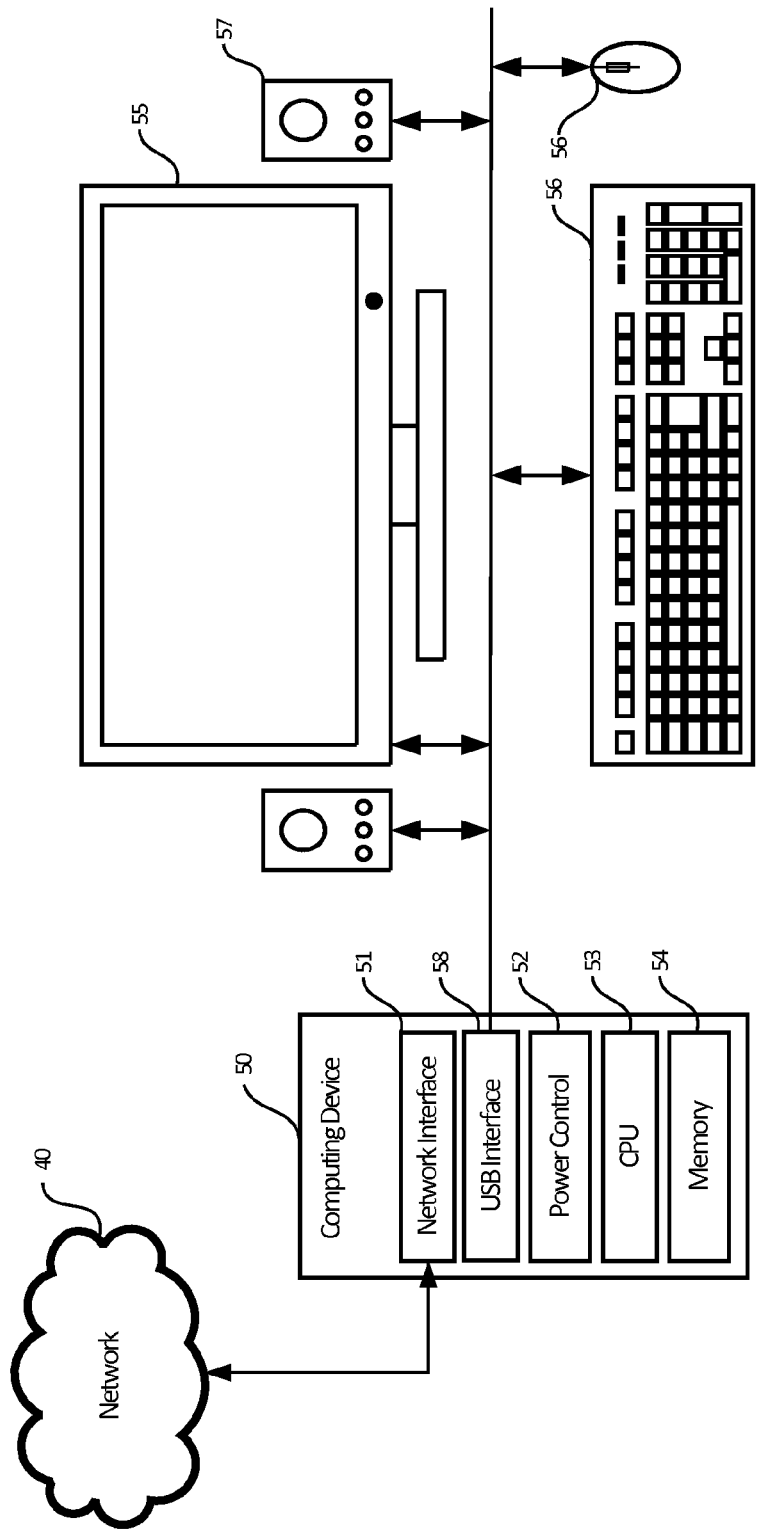
FIG. 3 shows an exemplary computing device of the system according to certain embodiments of the present disclosure.

FIG. 3 shows an exemplary computing device 50 of the system 100 according to certain embodiments of the present disclosure. In certain embodiments, the computing device 50 has a computing device ID (CDID). In certain embodiments, the computing device 50 may be a laptop computer, a desktop computer, a mobile communication device, a tablet device, or a thin client device. As shown in FIG. 3, the computing device 50 has: a network interface controller 51, a power control module 52, a CPU or a processor 53, and a memory 54. The network interface controller 51 is used to receive instructions from the power management controller 30, and the power control module 52 is used to perform power management functions of the computing device 50. The computing device 50 may also include one or more peripheral devices attached to the computing device 50. The peripheral device may include, without being limited to, one or more monitors 55, a keyboard and a mouse 56, and one or more multimedia devices 57. The power control module 52 may be used to receive instructions from the power management module 36 of the power management controller 30, and perform power control based on the instructions over the one or more monitors 55, the keyboard and the mouse 56, and the one or more multimedia devices 57.

In certain embodiments, the computing devices 50 may be an advance configuration and power interface (ACPI) compatible computing device that is capable of performing power management by an operating system of the computing device.

In certain embodiments, each of the computing devices 50 may further include (a) a network interface card (NIC) 51 for receiving power management instructions from the power management controller 30, and (b) a power control device 52 for performing power management functions of the computing device 50 according to the power management instructions received. In certain embodiments, each of the computing devices 50 may also include: one or more monitors 55, one or more multimedia devices 57, a mouse 56, and a keyboard 56.

In computing, the ACPI specification provides an open standard for device configuration and power management by the operating system. ACPI defines platform-independent interfaces for hardware discovery, configuration, power management and monitoring. With the intention of replacing Advanced Power Management, the MultiProcessor Specification and the Plug and Play BIOS Specification, the standard brings power management under the control of the operating system, as opposed to the previous BIOS-central system which relied on platform-specific firmware to determine power management and configuration policy. The specification is central to Operating System-directed configuration and Power Management (OSPM), a system implementing ACPI which removes device management responsibilities from legacy firmware interfaces. As the ACPI technology gained wider adoption with many operating systems and processor architectures, the desire to improve the governance model of the specification has increased significantly.

Once an OSPM-compatible operating system activates ACPI, it takes over and has exclusive control of all aspects of power management and device configuration. The OSPM implementation must expose an ACPI-compatible environment to device drivers, which exposes certain system, device and processor states.

The ACPI specification defines the following four Global "Gx" states and six Sleep "Sx" states for an ACPI-compliant computer-system:

G0 (S0), Working: "Awaymode" is a subset of S0, where monitor is off but background tasks are running G1, Sleeping: Divided into four states, S1 through S4:
S1, Power on Suspend (POS): All the processor caches are flushed, and the CPU(s) stops executing instructions. The power to the CPU(s) and RAM is maintained. Devices that do not indicate they must remain on, may be powered off.
S2: CPU powered off. Dirty cache is flushed to RAM.
S3, commonly referred to as Standby, Sleep, or Suspend to RAM (STR): RAM remains powered.
S4, Hibernation or Suspend to Disk: All content of the main memory is saved to non-volatile memory such as a hard drive, and is powered down.

G2 (S5), Soft Off: G2/S5 is almost the same as G3 Mechanical Off, except that the power supply unit (PSU) still supplies power, at a minimum, to the power button to allow return to S0. A full reboot is required. No previous content is retained. Other components may remain powered so the computer can "wake" on input from the keyboard, clock, modem, LAN, or USB device.

G3, Mechanical Off: The computer's power has been totally removed via a mechanical switch (as on the rear of a PSU). The power cord can be removed and the system is safe for disassembly (typically, only the real-time clock continues to run—using its own small battery).

An ACPI compatible computing device 50 is configured to receive instructions from the power management module 36 of the power management controller 30 through the network 80, and the network interface controller 51 of the computing device 50, and perform power management control of the computing device 50 as well as its peripherals such as the monitors 55, the keyboard/mouse 56 and the multimedia device 57, using the power control module 52 of the computing device 50. The power management control of the computing device 50 includes various instructions to perform global state transition among the 4 global states, and 6 different sleeping states as discussed above, including completely power on, and completely power off.

When the power management system 100 determines to power on or power off one or more computing devices 50 as identified, the powering on and the powering off may not necessarily be performed immediately. In certain embodiments, when the power management system 100 instructs the target device to power on or power off, a power-on delay T1 may be applied to delay powering on of the target device, and a power-off delay T2 may be applied to delay the powering off of the target device.

In certain embodiments, for example, when a user drives into a parking garage, and a parking management system may detect the user's presence at the parking garage. On one hand, it may take certain time (e.g. T-walk) for the user to reach his/her desk. On the other hand, it may take certain time (e.g. T-power-on) for the computing devices 50 to power on and be ready for the user to use. The optional power-on delay T1 may be defined as: (T-walk)−(T-power-on) such that the virtual machine will be ready when the employee arrives to his/her office. This optional power-on delay T1 may be adjusted by the work load of the virtual machine identified at the time, or the applications to be reloaded on the virtual desktop.

In certain embodiments, the user may experience one ingress event and another egress event within a short period of time. For example, when the user stops by the office to pick up something from the desk without the need of using the computing device 50, the user may experience one ingress event and another egress event within a short period of time. In this case, a power-on delay T1 may avoid unnecessary power on and then power off of the computing devices 50 associated with the user.

In certain embodiments, the user may experience one egress event and another ingress event within a short period of time. For example, when the user leaves his/her desk to retrieve something from his/her car in the parking garage, or for a quick meeting, the user may experience one egress event and another ingress event within a short period of time. In this case, a power-off delay T2 of 10 minutes may avoid unnecessary power off and then power on of the computing devices 50 associated with the user.

These delays are used to maximize the energy conservations, and avoid certain unnecessary power on operations or power off operations. The values of the power-on delay T1, and the power-off delay T2 can be customized and set for each individual user independently in the power management system 100.

In certain embodiments, after the power management system 100 determines to power off a computing device 50 as identified, the computing device 50 may disable certain user interface intensive tasks to free up processing power (CPU, memory) and other resources or components of the VDI system 100 to allow other resource intensive tasks to run faster. In certain embodiments, when the power management system 100 determines to power off a computing device 50 as identified, the computing device 50 may have certain unfinished tasks running. For example, the user of the computing device 50 may leave the computing device 50 running certain batch processing tasks, which are resource intensive tasks. If the computing device 50 is powered off during the running of the batch processing tasks, then the batch processing tasks may be interrupted, which is not desirable. However, since the user has left, certain user interface intensive tasks will not be needed, and may thus be disabled or suspended without interrupting the batch processing tasks. When these user interface related/intensive tasks are disabled, the resources of the computing device 50, such as CPU power, memory, or graphical processing power, may be freed up, and allowing the computing device 50 to run the batch processing tasks faster and more efficiently.

In certain embodiments, the power management system 100 may be configured to create one or more lists of tasks for future restoration purposes. For example, the power management system 100 may create two lists, including a first list of tasks to be continued until these tasks are completed, and a second list of suspended/disabled tasks. The first list includes all tasks that must be continued until they are completed. In certain embodiments, the tasks on the first list may include the resource intensive tasks as described above. The computing device 50 will not be powered off until all the tasks on the first list are completed. The second list includes all tasks that may be suspended or disabled during the execution of the tasks on the first list, after the user experienced an egress event. In certain embodiments, the tasks on the second list may include the user interface intensive tasks as described above. The tasks on the second list may be restored when the user experiences an ingress event such that the computing device 50 is recovered to the state prior to the last egress event.

Figure 4:
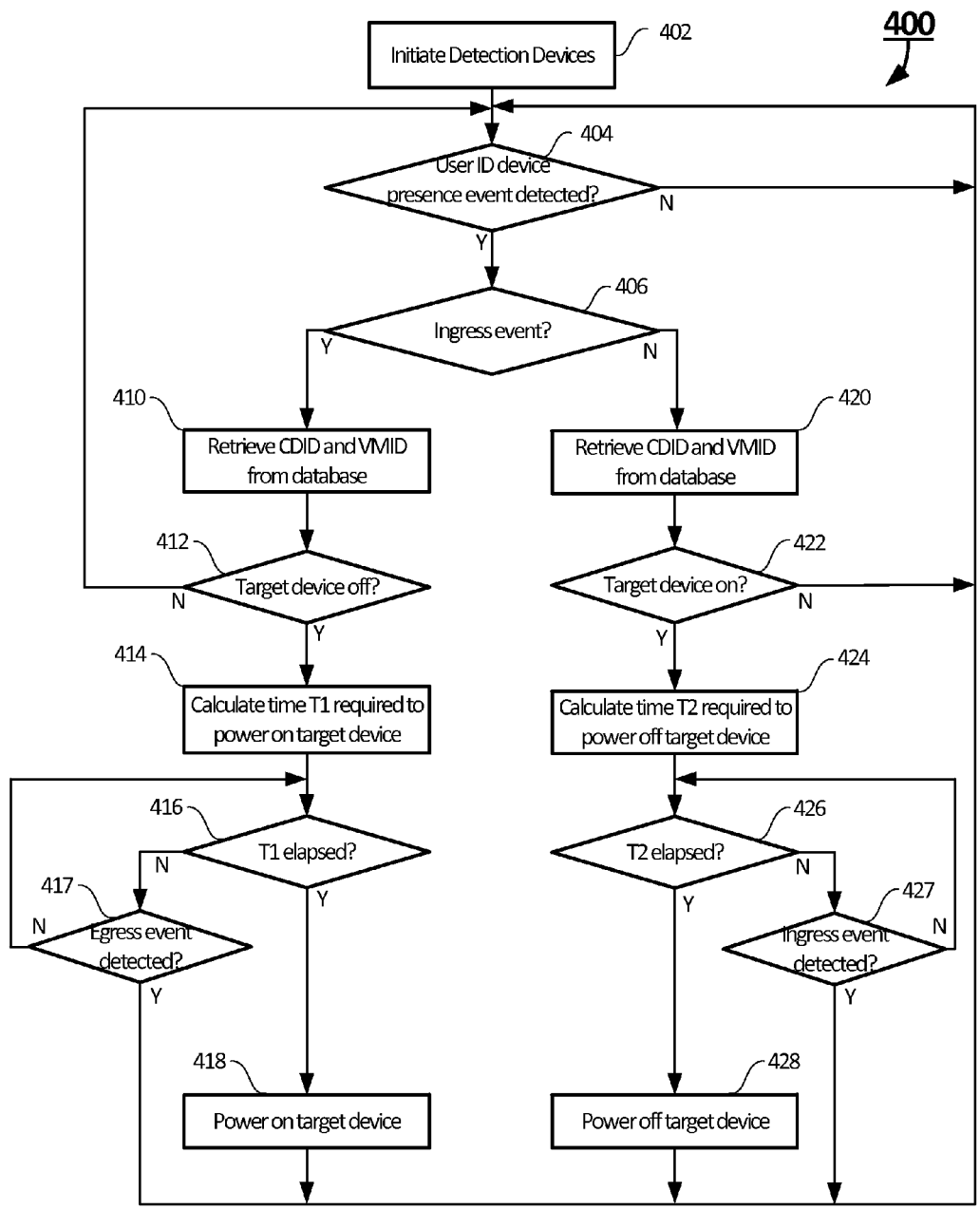
FIG. 4 shows a flow chart of a method of performing power management of a system according to certain embodiments of the present disclosure.

FIG. 4 shows a flow chart of a method of performing power management of a system according to certain embodiments of the present disclosure.

At operation 402, a power management program is started when the power management controller 30 initiates and starts the detection devices 20. Once the detection devices 20 is initiated, the detection device 20 starts detecting the user ID devices 10 within the range of detection.

At operation 404, the power management controller 30 waits for the detection signals from the detection devices 20. When no detection signal is received, the power management controller 30 does nothing. When the power management controller 30 receives detection signals from the detection signals from the detection devices 20, the power management controller determines, based on the received detection signals, whether a user ID device presence event occurs. When a user ID device presence event occurs, the program continues to operation 406.

At operation 406, the power management controller 30 checks whether the user ID device presence event is an ingress event or an egress event. When the user ID device presence event is the ingress event, the program proceeds to operation 410. When the user ID device presence event is the egress event, the program proceeds to operation 420.

At operation 410, the power management controller 30 receives the user ID and the user ID device presence event (i.e. the ingress event), and identifies the CDID and the VMID associated with the corresponding user ID of the user ID device 10 being detected. Specifically, the user ID lookup module 37 of the power management controller 30 is configured to lookup in the database 40 for retrieving the CDID and the VMID associated with the corresponding user ID of the user ID device 10 from the database 40. Based on the retrieved CDID and VMID, the determination module 38 of the power management controller 30 may determine the target device corresponding to the detected user ID device 10. In certain embodiments, the target device may be at least one of the VM 72 corresponding to the associated VMID, the computing device 50 corresponding to the associated CDID, and a peripheral device attached to the computing device 50 corresponding to the associated CDID.

At operation 412, the power management controller 30 checks whether the target device is in an "off" state. If the target device is in an "on" state, the program goes back to operation 404 to wait for the next user ID device presence event since the target device is already powered on. If the target device is in an "off" state, the program continues to operation 414 to power on the target device in the "off" state.

At operation 414, the power management controller 30 calculates the power-on delay T1 for the target device to be powered on, and starts a power-on delay timer.

At operation 416, the program monitors the power-on delay timer and waits for the power-on delay timer to go off. Specifically, when the power-on delay T1 elapsed, which means the power-on delay timer goes off, the program continues to operation 418. On the other hand, if the power-on delay T1 has not elapsed, the program continues to operation 417.

At operation 417, the power management controller 30 checks whether a further egress event is detected. Specifically, as discussed above, the user may experience one ingress event and another egress event within a short period of time. In this case, during the waiting process for the power-on delay T1 to elapse at operation 416, the egress event may occur. When the egress event is detected, the program goes back to operation 404 to wait for the next user ID device presence event, without powering on the target device. In other words, the target device remains in the "off" state. On the other hand, if no egress event is detected, the program goes back to operation 416 to keep waiting for the power-on delay T1 to elapse.

At operation 418, the power management controller 30 sends instructions to power on the target device in the "off" state. The program goes back to operation 404 to wait for the next user ID device presence event.

At operation 420, the power management controller 30 receives the user ID and the user ID device presence event (i.e. the egress event), and identifies CDID and the VMID associated with the corresponding user ID of the user ID device 10 being detected. Specifically, the user ID lookup module 37 of the power management controller 30 is configured to lookup in the database 40 for retrieving the CDID and the VMID associated with the corresponding user ID of the user ID device 10 from the database 40. Based on the retrieved CDID and VMID, the determination module 38 of the power management controller 30 may determine the target device corresponding to the detected user ID device 10. In certain embodiments, the target device may be at least one of the VM 72 corresponding to the associated VMID, the computing device 50 corresponding to the associated CDID, and a peripheral device attached to the computing device 50 corresponding to the associated CDID.

At operation 422, the power management controller 30 checks whether the target device is in an "on" state. If the target device is in an "off" state, the program goes back to operation 404 to wait for the next user ID device presence event since the target device is already powered off. If the target device is in an "on" state, the program continues to operation 414 to power off the target device in the "on" state.

At operation 424, the power management controller 30 calculates the power-off delay T2 for the target device to be powered off, and starts a power-off delay timer.

At operation 426, the program monitors the power-off delay timer and waits for the power-off delay timer to go off. Specifically, when the power-off delay T2 elapsed, which means the power-off delay timer goes off, the program continues to operation 428. On the other hand, if the power-off delay T2 has not elapsed, the program continues to operation 427.

At operation 427, the power management controller 30 checks whether a further ingress event is detected. Specifically, as discussed above, the user may experience one egress event and another ingress event within a short period of time. In this case, during the waiting process for the power-off delay T2 to elapse at operation 426, the ingress event may occur. When the ingress event is detected, the program goes back to operation 404 to wait for the next user ID device presence event, without powering off the target device. In other words, the target device remains in the "on" state. On the other hand, if no ingress event is detected, the program goes back to operation 426 to keep waiting for the power-off delay T2 to elapse.

At operation 428, the power management controller 30 sends instructions to power off the target device in the "off" state. The program goes back to operation 404 to wait for the next user ID device presence event.

The program continues until the power management system 100 is shut down.

In a further aspect, the present disclosure is related to a non-transitory computer storage medium storing computer executable instructions. The instructions, when executed at one or more processors 31 of a power management controller 30, may cause the processors 31 to perform the method as described above. In certain embodiments, the non-transitory computer storage medium may include, but not limited to, any physical or virtual storage media. In certain embodiments, the non-transitory computer storage medium may be implemented as the memory 33 of the power management controller 30 as shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A system, comprising:
a plurality of user identification (ID) devices, each corresponding to a user ID;
a plurality of computing devices, each corresponding to a computing device ID (CDID), wherein each of the user IDs is associated with one of the CDIDs;

at least one detection device configured to generate detection signals based on detection of the user ID devices;

a virtual machine server configured to execute a plurality of virtual machines (VMs), wherein each of the VMs corresponds to a virtual machine ID (VMID), wherein each of the user IDs is associated with one of the VMIDs; and a power management controller being connected to the computing devices, the at least one detection device and the virtual machine server through a network, the power management controller comprising a processor and a memory storing computer executable instructions, wherein the computer executable instructions, when executed at the processor, are configured to receive the detection signals from the at least one detection device through the network; and for each of the user ID devices being detected by the at least one the detection device, retrieve, from the received detection signals, the corresponding user ID of the detected user ID device;

determine, based on the received detection signals, a user ID device presence event related to the detected user ID device, wherein the user ID device presence event is one of an ingress event when a carrier of the detected user ID device moves into a predefined area, and an egress event when the carrier of the detected user ID device moves out from the predefined area;

in response to determining the user ID device presence event related to the detected user ID device, retrieve the CDID and the VMID associated with the corresponding user ID of the detected user ID device from a database;

in response to retrieving the CDID and the VMID associated with the corresponding user ID of the detected user ID device, determine a target device based on the CDID and the VMID associated with the corresponding user ID of the detected user ID device, wherein the target device comprises at least one of the VM corresponding to the associated VMID, the computing device corresponding to the associated CDID, and a peripheral device attached to the computing device corresponding to the associated MID;

when the determined user ID device presence event related to the detected user ID device is the ingress event and when the target device is in an off state, power on the target device; and when the determined user ID device presence event related to the detected user ID device is the egress event and when the target device is in an on state, power off the target device.

2. The system of claim 1, wherein each of the plurality of user ID devices represents a user and stores the corresponding user ID therein.

3. The system of claim 2, wherein for each of the user ID devices, the carrier of the user ID device is the user being represented by the user ID device.

4. The system of claim 3, wherein the at least one detection device comprises:

a security control system of the predefined area configured to detect the arrivals and departures of the users carrying the user ID devices individually;

a proximity detection device configured to detect the presence at and the departure from the predefined area for each of the users carrying the user ID devices individually; and a wireless device detection device configured to detect the presence at and the departure from the predefined area for each of the users carrying the user ID devices individually.

5. The system of claim 4, wherein the computer executable instructions are configured to determine, based on the received detection signals, the user ID device presence event related to the detected user ID device by:

determining that the user ID device presence event is the ingress event when the received detection signals indicate that:

the user arrives at the predefined area through the security control system;

the user ID transmitted from the user ID device is detected by the proximity detection device of the predefined area upon the user's arrival; and the user ID transmitted from the user ID device is detected by the wireless device detection device of the predefined area upon the user's arrival; and determining that the user ID device presence event is the egress event when the received detection signals indicate that:

the user departs from the predefined area through the security control system;

the user ID transmitted from the user ID device is detected by the proximity detection device of the predefined area upon the user's departure; and the user ID transmitted from the user ID device is detected by the wireless device detection device of the predefined area upon the user's departure.

6. The system of claim 1, wherein each of the user ID devices is a portable device capable of transmitting the user ID to the detection device, wherein the portable device is a key card, a proximity card, a proximity key tag, a radio-frequency identification (RFID) card, a near field communication (NFC) device, or a mobile communication device.

7. The system of claim 1, wherein the power management controller further comprises a network interface controller configured to connect the power management controller to the network.

8. The system of claim 1, wherein the computer executable instructions comprise:

a determination module configured to, for each of the user ID devices being detected, retrieve, based on the received detection signals, the corresponding user ID of the detected user ID device;

determine the user ID device presence event related to the detected user ID device; and in response to retrieving the CDID and the VMID associated with the corresponding user ID of the detected user ID device, determine the target device based on the CDID and the VMID associated with the corresponding user ID of the detected user ID device;

a user ID lookup module configured to, for each of the user ID devices being detected, retrieve the CDID and the VMID associated with the corresponding user ID of the detected user ID device from the database in response to determining the user ID device presence event related to the detected user ID device; and a power management module configured to, for each of the user ID devices being detected, when the determined user ID device presence event related to the detected user ID device is the ingress event and when the target device is in an off state, power on the target device; and when the determined user ID device presence event related to the detected user ID device is the egress event and when the target device is in an on state, power off the target device.

9. The system of claim 8, wherein the computer executable instructions further comprise a web server module configured to allow an administrator to perform power management system functions over the network.

10. The system of claim 1, wherein the computer executable instructions are further configured to:
   receive and store registration information of each of the user ID devices with the corresponding user ID in the database, wherein the registration information comprises the corresponding user ID;
   receive and store the CDIDs corresponding to the computing devices in the database;
   receive and store the VMIDs corresponding to the VMs in the database; and
   receive and store association information of the user IDs to the CDIDs and the user IDs to the VMIDs in the database.

11. The system of claim 1, wherein each of the computing devices is a laptop computer, a desktop computer, a mobile communication device, a tablet device, or a thin client device; and
   wherein the peripheral device attached to each of the computing devices comprises one or more monitors, one or more multimedia devices, a mouse, a keyboard, an input device, and a storage device.

12. The system of claim 1, wherein the computer executable instructions are further configured to:
   when powering on the target device, apply a power-on delay T1 to delay powering on of the target device; and
   when powering off the target device, apply a power-off delay T2 to delay the powering off of the target device.

13. A computer-implemented method of performing power management of a system, the method comprising:
   receiving, at a power management controller, detection signals from at least one detection device through a network, wherein the at least one detection device is configured to generate the detection signals based on detection of a plurality of user identification (ID) devices, wherein each of the user ID devices corresponds to a user ID, and wherein each of the user IDs is associated with a computing device ID (CDID) and a virtual machine ID (VMID); and
   for each of the user ID devices being detected by the at least one the detection device,
      retrieving, at the power management controller, the corresponding user ID of the detected user ID device from the received detection signals;
      determining, at the power management controller, a user ID device presence event related to the detected user ID device based on the received detection signals, wherein the user ID device presence event is one of an ingress event when a carrier of the detected user ID device moves into a predefined area, and an egress event when the carrier of the detected user ID device moves out from the predefined area;
      in response to determining the user ID device presence event related to the detected user ID device, retrieving, at the power management controller, the CDID and the VMID associated with the corresponding user ID of the detected user ID device from a database;
      in response to retrieving the CDID and the VMID associated with the corresponding user ID of the detected user ID device, determining, at the power management controller, a target device based on the CDID and the VMID associated with the corresponding user ID of the detected user ID device, wherein the target device comprises at least one of a virtual machine (VM) corresponding to the associated VMID, a computing device corresponding to the associated CDID, and a peripheral device attached to the computing device corresponding to the associated CDID;
      when the determined user ID device presence event related to the detected user ID device is the ingress event and when the target device is in an off state, powering on the target device by the power management controller; and
      when the determined user ID device presence event related to the detected user ID device is the egress event and when the target device is in an on state, powering off the target device by the power management controller.

14. The computer-implemented method of claim 13, wherein each of the plurality of user ID devices represents a user and stores the corresponding user ID therein.

15. The computer-implemented method of claim 14, wherein for each of the user ID devices, the carrier of the user ID device is the user being represented by the user ID device.

16. The computer-implemented method of claim 15, wherein the power management controller comprises:
   a processor;
   a network interface controller configured to connect the power management controller to a network; and
   a memory storing computer executable instructions, wherein the computer executable instructions comprise:
      a determination module configured to, for each of the user ID devices being detected,
         retrieve, based on the received detection signals, the corresponding user ID of the detected user ID device;
         determine the user ID device presence event related to the detected user ID device; and
         in response to retrieving the CDID and the VMID associated with the corresponding user ID of the detected user ID device, determine the target device based on the CDID and the VMID associated with the corresponding user ID of the detected user ID device;
      a user ID lookup module configured to, for each of the user ID devices being detected, retrieve the CDID and the VMID associated with the corresponding user ID of the detected user ID device from the database in response to determining the user ID device presence event related to the detected user ID device; and
      a power management module configured to, for each of the user ID devices being detected,
         when the determined user ID device presence event related to the detected user ID device is the ingress event and when the target device is in an off state, power on the target device; and when the determined user ID device presence event related to the detected user ID device is the egress event and when the target device is in an on state, power off the target device.

17. The computer-implemented method of claim 16, wherein the computer executable instructions further comprise a web server module configured to allow an administrator to perform power management system functions over the network.

18. The computer-implemented method of claim 13, further comprising:
  receiving and storing, at the power management controller, registration information of each of the user ID devices with the corresponding user ID in the database, wherein the registration information comprises the corresponding user ID;
  receiving and storing, at the power management controller, the CDIDs corresponding to the computing devices in the database;
  receiving and storing, at the power management controller, the VMIDs corresponding to the VMs in the database; and
  receiving and storing, at the power management controller, association information of the user IDs to the CDIDs and the user IDs to the VMIDs in the database.

19. The computer-implemented method of claim 13, wherein each of the user ID devices is a portable device capable of transmitting the user ID to the detection device, wherein the portable device is a key card, a proximity card, a proximity key tag, a radio-frequency identification (RFID) card, a near field communication (NFC) device, or a mobile communication device.

20. The computer-implemented method of claim 13, further comprising:
  when powering on the target device, applying a power-on delay T1 to delay powering on of the target device; and
  when powering off the target device, applying a power-off delay T2 to delay the powering off of the target device.

21. A non-transitory computer storage medium having computer-executable instructions stored thereon which, when executed by a processor of a power management controller, cause the processor to:
  receive detection signals from at least one detection device through a network, wherein the at least one detection device is configured to generate the detection signals based on detection of a plurality of user identification (ID) devices, wherein each of the user ID devices corresponds to a user ID, and wherein each of the user IDs is associated with a computing device ID (CDID) and a virtual machine ID (VMID); and
  for each of the user ID devices being detected by the at least one the detection device,
    retrieve the corresponding user ID of the detected user ID device, from the received detection signals;
    determine, based on the received detection signals, a user ID device presence event related to the detected user ID device, wherein the user ID device presence event is one of an ingress event when a carrier of the detected user ID device moves into a predefined area, and an egress event when the carrier of the detected user ID device moves out from the predefined area;
    in response to determining the user ID device presence event related to the detected user ID device, retrieve the CDID and the VMID associated with the corresponding user ID of the detected user ID device from a database;
    in response to retrieving the CDID and the VMID associated with the corresponding user ID of the detected user ID device, determine a target device based on the CDID and the VMID associated with the corresponding user ID of the detected user ID device, wherein the target device comprises at least one of a VM corresponding to the associated VMID, a computing device corresponding to the associated CDID, and a peripheral device attached to the computing device corresponding to the associated CDID;
    when the determined user ID device presence event related to the detected user ID device is the ingress event and when the target device is in an off state, power on the target device; and
    when the determined user ID device presence event related to the detected user ID device is the egress event and when the target device is in an on state, power off the target device.

22. The non-transitory computer storage medium of claim 21, wherein each of the plurality of user ID devices represents a user and stores the corresponding user ID therein.

23. The non-transitory computer storage medium of claim 22, wherein for each of the user ID devices, the carrier of the user ID device is the user being represented by the user ID device.

24. The non-transitory computer storage medium of claim 21, wherein the computer executable instructions comprise:
  a determination module configured to, for each of the user ID devices being detected,
    retrieve, based on the received detection signals, the corresponding user ID of the detected user ID device;
    determine the user ID device presence event related to the detected user ID device; and
    in response to retrieving the CDID and the VMID associated with the corresponding user ID of the detected user ID device, determine the target device based on the CDID and the VMID associated with the corresponding user ID of the detected user ID device;
  a user ID lookup module configured to, for each of the user ID devices being detected, retrieve the CDID and the VMID associated with the corresponding user ID of the detected user ID device from the database in response to determining the user ID device presence event related to the detected user ID device; and
  a power management module configured to, for each of the user ID devices being detected,
    when the determined user ID device presence event related to the detected user ID device is the ingress event and when the target device is in an off state, power on the target device; and
    when the determined user ID device presence event related to the detected user ID device is the egress event and when the target device is in an on state, power off the target device.

25. The non-transitory computer storage medium of claim 24, wherein the computer executable instructions further comprise a web server module configured to allow an administrator to perform power management system functions over the network.

26. The non-transitory computer storage medium of claim 21, wherein the computer executable instructions are further configured to:
  receive and store registration information of each of the user ID devices with the corresponding user ID in the database, wherein the registration information comprises the corresponding user ID;

receive and store the CDIDs corresponding to the computing devices in the database;

receive and store the VMIDs corresponding to the VMs in the database; and receive and store association information of the user IDs to the CDIDs and the user IDs to the VMIDs in the database.

27. The non-transitory computer storage medium of claim 21, wherein each of the user ID devices is a portable device capable of transmitting the user ID to the detection device, wherein the portable device is a key card, a proximity card, a proximity key tag, a radio-frequency identification (RFID) card, a near field communication (NFC) device, or a mobile communication device.

28. The non-transitory computer storage medium of claim 21, wherein the computer executable instructions are further configured to:

when powering on the target device, apply a power-on delay T1 to delay powering on of the target device; and when powering off the target device, apply a power-off delay T2 to delay the powering off of the target device.

* * * * *